United States Patent
Bennett et al.

(10) Patent No.: US 10,361,981 B2
(45) Date of Patent: Jul. 23, 2019

(54) AUTOMATIC EXTRACTION OF COMMITMENTS AND REQUESTS FROM COMMUNICATIONS AND CONTENT

(71) Applicant: Microsoft Technology Licensing, LLC, Redmond, WA (US)

(72) Inventors: Paul Nathan Bennett, Kirkland, WA (US); Nirupama Chandrasekaran, Seattle, WA (US); Michael Gamon, Seattle, WA (US); Nikrouz Ghotbi, Bellevue, WA (US); Eric Joel Horvitz, Kirkland, WA (US); Richard L. Hughes, Monroe, WA (US); Prabhdeep Singh, Newcastle, WA (US); Ryen William White, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/714,137

(22) Filed: May 15, 2015

(65) Prior Publication Data

US 2016/0337295 A1    Nov. 17, 2016

(51) Int. Cl.
| | |
|---|---|
| H04L 12/58 | (2006.01) |
| G06Q 10/06 | (2012.01) |
| G06Q 10/10 | (2012.01) |

(52) U.S. Cl.
CPC ............ *H04L 51/18* (2013.01); *G06Q 10/06* (2013.01); *G06Q 10/10* (2013.01); *H04L 51/04* (2013.01); *H04L 51/046* (2013.01); *H04L 51/10* (2013.01)

(58) Field of Classification Search
CPC .. G06F 17/2785; G06Q 10/10; G06Q 10/107; H04L 51/18
See application file for complete search history.

(56) References Cited

U.S. PATENT DOCUMENTS

| | | |
|---|---|---|
| 5,864,848 A | 1/1999 | Horvitz et al. |
| 6,278,996 B1 | 8/2001 | Richardson et al. |
| (Continued) | | |

FOREIGN PATENT DOCUMENTS

| | | |
|---|---|---|
| CN | 101198976 A | 6/2008 |
| CN | 102147898 | 8/2011 |
| (Continued) | | |

OTHER PUBLICATIONS

Carvalho et al., "Improving 'Email Speech Acts' Analysis via N-gram Selection", in the Proceedings of the HLT-NAACL 2006 Workshop on Analyzing Conversations in Text and Speech, Jun. 8, 2006, 7 pages.

(Continued)

*Primary Examiner* — Jeong S Park
(74) *Attorney, Agent, or Firm* — Merchant & Gould

(57) ABSTRACT

A system that analyses content of electronic communications may automatically extract requests or commitments from the electronic communications. In one example process, a processing component may analyze the content to determine one or more meanings of the content; query content of one or more data sources that is related to the electronic communications; and based, at least in part, on (i) the one or more meanings of the content and (ii) the content of the one or more data sources, automatically identify and extract a request or commitment from the content. Multiple actions may follow from initial recognition and extraction, including confirmation and refinement of the description of the request or commitment, and actions that assist one or more of the senders, recipients, or others to track and address the request or commitment, including the creation of additional messages, reminders, appointments, or to-do lists.

20 Claims, 6 Drawing Sheets

(56) References Cited

U.S. PATENT DOCUMENTS

| | | | |
|---|---|---|---|
| 6,452,083 B2 | 9/2002 | Pachet et al. | |
| 6,505,167 B1 | 1/2003 | Horvitz et al. | |
| 6,553,358 B1 | 4/2003 | Horvitz | |
| 6,560,590 B1 | 5/2003 | Shwe et al. | |
| 6,581,050 B1 | 6/2003 | Horvitz et al. | |
| 6,622,160 B1 | 9/2003 | Horvitz | |
| 6,657,643 B1 | 12/2003 | Horvitz et al. | |
| 6,714,967 B1 | 3/2004 | Horvitz | |
| 6,931,384 B1 | 8/2005 | Horvitz et al. | |
| 6,990,634 B2 | 1/2006 | Conroy et al. | |
| 7,146,381 B1 | 12/2006 | Allen et al. | |
| 7,158,980 B2 | 1/2007 | Shen | |
| 7,194,681 B1 | 3/2007 | Horvitz | |
| 7,409,423 B2 | 8/2008 | Horvitz et al. | |
| 7,444,383 B2 | 10/2008 | Horvitz | |
| 7,454,393 B2 | 11/2008 | Horvitz et al. | |
| 7,496,500 B2 | 2/2009 | Reed | |
| 7,742,048 B1* | 6/2010 | Moore | G06F 17/2881 345/467 |
| 7,877,447 B2 | 1/2011 | Wilson | |
| 8,055,707 B2 | 11/2011 | Desai et al. | |
| 8,166,178 B2 | 4/2012 | Horvitz | |
| 8,326,859 B2 | 12/2012 | Paek et al. | |
| 8,423,347 B2 | 4/2013 | Tunning et al. | |
| 8,484,745 B2 | 7/2013 | Bank et al. | |
| 8,631,080 B2 | 1/2014 | Goodman et al. | |
| 8,676,566 B2 | 3/2014 | Myaeng et al. | |
| 8,694,593 B1 | 4/2014 | Wren et al. | |
| 8,825,474 B1 | 9/2014 | Zhai et al. | |
| 8,832,205 B2 | 9/2014 | Nelson et al. | |
| 8,868,670 B2 | 10/2014 | Bagga et al. | |
| 8,903,924 B2 | 12/2014 | Jensen et al. | |
| 9,085,303 B2 | 7/2015 | Wolverton et al. | |
| 9,094,361 B2 | 7/2015 | Camacho et al. | |
| 9,170,993 B2 | 10/2015 | Kalia et al. | |
| 9,313,162 B2 | 4/2016 | Kumar et al. | |
| 9,378,196 B1 | 6/2016 | Tomkins et al. | |
| 9,460,095 B2 | 10/2016 | Ayers et al. | |
| 9,514,448 B2 | 12/2016 | Prakash et al. | |
| 9,633,114 B1 | 4/2017 | Kamanger | |
| 9,686,367 B2 | 6/2017 | Sundstrom | |
| 2002/0076109 A1 | 6/2002 | Hertzfeld | |
| 2002/0174170 A1 | 11/2002 | Ioffe et al. | |
| 2002/0184321 A1 | 12/2002 | Fishman et al. | |
| 2003/0187632 A1* | 10/2003 | Menich | G06Q 10/10 704/1 |
| 2004/0012638 A1 | 1/2004 | Donnelli et al. | |
| 2004/0148356 A1 | 7/2004 | Bishop et al. | |
| 2004/0260772 A1 | 12/2004 | Mullen et al. | |
| 2005/0076037 A1 | 4/2005 | Shen | |
| 2005/0076084 A1 | 4/2005 | Loughmiller | |
| 2005/0091578 A1 | 4/2005 | Madan et al. | |
| 2005/0108354 A1 | 5/2005 | Lisitsa | |
| 2005/0165631 A1 | 7/2005 | Horvitz | |
| 2005/0192992 A1 | 9/2005 | Reed et al. | |
| 2006/0074844 A1 | 4/2006 | Frankel et al. | |
| 2006/0168040 A1 | 7/2006 | Kushmerick et al. | |
| 2006/0195785 A1* | 8/2006 | Portnoy | G06Q 10/107 715/700 |
| 2006/0218553 A1 | 9/2006 | Dore et al. | |
| 2007/0005409 A1 | 1/2007 | Boss et al. | |
| 2007/0038711 A1 | 2/2007 | McBeth et al. | |
| 2007/0043838 A1* | 2/2007 | Litteaut | G06F 17/289 709/220 |
| 2007/0073810 A1 | 3/2007 | Adams et al. | |
| 2008/0033950 A1 | 2/2008 | Lemay et al. | |
| 2008/0034315 A1 | 2/2008 | Langoulant et al. | |
| 2008/0040189 A1 | 2/2008 | Tong et al. | |
| 2008/0065719 A1 | 3/2008 | Wilson | |
| 2008/0086300 A1 | 4/2008 | Anismovich et al. | |
| 2008/0147622 A1 | 6/2008 | Koike | |
| 2008/0172606 A1 | 7/2008 | White | |
| 2008/0201636 A1* | 8/2008 | Fujiwara | G06F 17/2775 715/700 |
| 2008/0281922 A1 | 11/2008 | Renshaw et al. | |
| 2009/0063993 A1 | 3/2009 | Nyamgondalu | |
| 2009/0076795 A1 | 3/2009 | Bangalore et al. | |
| 2009/0083112 A1 | 3/2009 | Bhogal et al. | |
| 2009/0106201 A1 | 4/2009 | White | |
| 2009/0214034 A1 | 8/2009 | Mehrotra et al. | |
| 2009/0228583 A1 | 9/2009 | Pocklington | |
| 2009/0235280 A1 | 9/2009 | Tannier et al. | |
| 2010/0070877 A1 | 3/2010 | Scott et al. | |
| 2010/0082751 A1* | 4/2010 | Meijer | G06F 15/16 709/206 |
| 2010/0145694 A1 | 6/2010 | Ju et al. | |
| 2011/0106892 A1 | 5/2011 | Nelson et al. | |
| 2011/0119212 A1* | 5/2011 | De Bruin | A61B 5/00 706/12 |
| 2011/0125734 A1 | 5/2011 | Duboue et al. | |
| 2011/0145822 A1 | 6/2011 | Rowe et al. | |
| 2011/0145823 A1 | 6/2011 | Rowe et al. | |
| 2011/0184936 A1 | 7/2011 | Lymberopoulos et al. | |
| 2011/0252351 A1 | 10/2011 | Sikora et al. | |
| 2012/0109965 A1 | 5/2012 | Nagendran et al. | |
| 2012/0143961 A1 | 6/2012 | Jonsson | |
| 2012/0245925 A1 | 9/2012 | Guha et al. | |
| 2012/0253788 A1 | 10/2012 | Heck et al. | |
| 2012/0254764 A1 | 10/2012 | Ayloo et al. | |
| 2012/0278388 A1 | 11/2012 | Kleinbart et al. | |
| 2012/0296832 A1 | 11/2012 | Beringer et al. | |
| 2013/0006973 A1 | 1/2013 | Caldwell et al. | |
| 2013/0007648 A1 | 1/2013 | Gamon et al. | |
| 2013/0138746 A1 | 5/2013 | Tardelli et al. | |
| 2013/0179440 A1 | 7/2013 | Gordon | |
| 2013/0218836 A1 | 8/2013 | Sullivan et al. | |
| 2013/0268468 A1 | 10/2013 | Vijayaraghavan et al. | |
| 2013/0297317 A1 | 11/2013 | Lee et al. | |
| 2014/0136256 A1 | 5/2014 | Brown | |
| 2014/0214404 A1 | 7/2014 | Kalia et al. | |
| 2014/0215472 A1 | 7/2014 | Motahari Nezhad et al. | |
| 2014/0219434 A1 | 8/2014 | Youel et al. | |
| 2014/0279622 A1 | 9/2014 | Lamoureux et al. | |
| 2014/0317030 A1 | 10/2014 | Shen et al. | |
| 2014/0365518 A1 | 12/2014 | Calo et al. | |
| 2015/0032724 A1 | 1/2015 | Thirugnanasundaram et al. | |
| 2015/0033155 A1* | 1/2015 | Camacho | H04L 51/32 715/758 |
| 2015/0143258 A1 | 5/2015 | Carolan et al. | |
| 2015/0169539 A1 | 6/2015 | Jamrog et al. | |
| 2015/0215253 A1 | 7/2015 | Vemuri et al. | |
| 2015/0294220 A1* | 10/2015 | Oreif | G06F 16/338 706/12 |
| 2015/0302301 A1 | 10/2015 | Petersen | |
| 2015/0348551 A1 | 12/2015 | Gruber et al. | |
| 2016/0086268 A1 | 3/2016 | Labuszewski et al. | |
| 2016/0104094 A1 | 4/2016 | Yom-tov et al. | |
| 2016/0125370 A1 | 5/2016 | Grassadonia et al. | |
| 2016/0179934 A1 | 6/2016 | Stubley et al. | |
| 2016/0182417 A1* | 6/2016 | Cordes | H04L 51/08 709/206 |
| 2016/0196490 A1 | 7/2016 | Chandrasekaran et al. | |
| 2016/0335572 A1 | 11/2016 | Bennett et al. | |
| 2017/0047064 A1* | 2/2017 | Kirihara | G06F 3/0482 |
| 2017/0149703 A1 | 5/2017 | Willett et al. | |

FOREIGN PATENT DOCUMENTS

| | | |
|---|---|---|
| CN | 102495860 B | 6/2012 |
| CN | 103440571 A | 12/2013 |
| EP | 1109121 | 6/2001 |
| JP | 11136278 | 5/1999 |
| JP | H-11-184924 | 7/1999 |
| JP | 2001216427 | 8/2001 |
| JP | 2009093503 | 4/2009 |
| JP | 2009223840 | 10/2009 |
| JP | 2010191864 | 9/2010 |
| KR | 20020021748 A | 3/2002 |
| KR | 1020100113791 A | 10/2010 |
| WO | 2015058604 A1 | 4/2015 |
| WO | 2015170963 A1 | 11/2015 |
| WO | 2016186834 A1 | 11/2016 |

(56) References Cited

FOREIGN PATENT DOCUMENTS

OTHER PUBLICATIONS

Corston-Oliver et al., "Integration of Email and Task Lists", in the Proceedings of the 2004 Collaboration , Electronic messaging, Anti-Abuse and Span Conference, Jul. 2004, 2 pages.
Corston-Oliver, et al., "Task-focused Summarization of Email", in the Proceedings of the ACL Workshop of the Text Summarizatin Branches Out, Jul. 2004, 9 pages.
Horvitz, Eric, "Principles of Mixed-Initiative User Interfaces", in the Proceedings of the 1999 SIGCHI Conference on Human Factors in Computing Systems, May 1999, 9 pages.
Kalia et al., "Identifying Business Tasks and Commitments from Email and Chat Conversations," in the Technical Report from HP Laboratories, 2013, 22 pages.
Lampert et al., "Requests and Commitments in Email are More Complex Than You Think: Eight Reasons to be Cautious", in the Proceedings of the Australasian Language Technology Association Workshop 2008, Dec. 8, 2008, 10 pages.
Torres-Moreno, "Automatic Text Summarization," Chapter 6, Source and Domain Specific Summarization, Sep. 24, 2014, p. 215.
The PCT Search Report dated May 30, 2016 for PCT application No. PCT/US2016/028002, 15 pages.
Pennacchiotti, et al., "Automatically Building Training Examples for Entity Extraction", Computational Natural Language Learning, Association for Computational Linguistics, Stroudsburg, PA, Jun. 23, 2011, pp. 163-171.
PCT 2nd Written Opinion in International Application PCT/US2016/028002, dated May 2, 2017, 9 pages.
Andrew Lampert et al., Detecting Emails Containing Requests for Action, Naacl 2010, pp. 984-992.
Andrew Lampert, et al. Requests and Commitments in Email are More Complex Than You Think: Eight Reasons to be Cautious. In Proceedings of Australasian Language Technology Workshop (ALTA 2008), pp. 55-63, Hobart, Australia.
Andrew Lampert, et al. The Nature of Requests and Commitments in Email Messages. In Proceedings of EMAIL-2008: the AAAI Workshop on Enhanced Messaging, pp. 42-47, Chicago.
Bellotti et al., "Taking Email to Task: The Design and eEvaluation of a Task Management Centered Email Tool", In Computer Human Interaction Conference 2003, CHI, pp. 345-352, Ft. Lauderdale, Florida.
Bilton. Reinventing E-Mail, One Message at a Time—The New York Times. Aug. 23, 2010 http://bils.biogs.nytimes.com/2010/08/23/reinventing-e-mail-one-message-at-a-time/, 2 pages.
Carvalho, "Modeling Intention in Email", CMU-LTI-08-007. 2008, located online at: http://www.lti.cs.cmu.edu/Research/ThesisNitorCarvalho_FinalVersion.pdf, 163 pages.
Chinese First Office Action Issued in Patent Application No. 201280031955.2, dated Feb. 24, 2016, 16 Pages.
Chinese Notice of Allowance in Patent Application 201280031955.2, dated Sep. 21, 2017, 4 pages.
Chinese Office Action and Search Report Issued in Patent Application No. 201280031955.2, dated Mar. 30, 2017, 16 Pages.
Chinese Office Action in Patent Application 201280031955.2, dated Jul. 21, 2017, 13 pages.
Chinese Office Action Issued in Patent Application No. 201280031955.2, dated Sep. 29, 2016, 13 Pages.
Chinese Second Office Action Issued in Patent Application No. 201280031955.2, dated Aug. 1, 2016, 14 Pages.
Cohen, "Learning to Classify Email into "Speech Acts"", In Conference on Empirical Methods in Natural Language Processing 2004, pp. 309-316, Barcelona, Spain.
European Search Report for Application No. 12804978.0 dated Jan. 27, 2015, 7 pages.
How to Sync Microsoft Outlook With Google Calendar, 2009, by Basu, 7 pages.
Hugo Liu, Hassan Alam, Rachmat Hartano, "Meeting Runner: An Automatic Email-Based Meeting Scheduler", BCL Technologies technical report, Jan. 21, 2002, 7 pages.
Japanese Notice of Allowance in Application 2014-518600, dated Dec. 8, 2016, 4 pages.
Japanese Office Action Issued in Japanese Patent Application No. 2014-518600, dated Dec. 8, 2016, 3 Pages.
Japanese Office Action Issued in Japanese Patent Application No. 2014-518600, dated May 12, 2016, 8 Pages.
Multiple Calendar Management on Outlook2010—copying appointments. 2010, 4 pages.
Outlook 2007 Tip: How to View Google Calendar inside Outlook 2007, 2007, by Shivaranjan, 5 pgs.
PCT International Preliminary Report on Patentability in Application PCT/US2016/028002, dated Jul. 31, 2017, 9 Pages.
PCT International Preliminary Report on Patentability in PCT/US2012/041786 dated Jan. 7, 2014, 6 pages.
PCT International Search Report and Written Opinion of PCT/US2012/041786 dated Dec. 28, 2012, 9 pages.
PCT Search Report and Written Opinion dated Jul. 14, 2016 for PCT Application No. PCT/US16/030615, 12 Pages.
Simon H. Corston-Oliver, et al. Task-focused Summarization of Email. In ACL-2004 Workshop: Text Summarization Branches Out, pp. 43-50.
Symantec Enterprise Vault TM Intelligent Archiving and Email Classification, Retention, Filtering, and Search—Retrieved Date: Oct. 4, 2010 http://www.symantec.com/connecl/sites/default/files/intelligent_archiving_and_email.pdf, 15 pgs.
Taiwo Ayodele, et al. Email Classification: Solution with Back Propagation Technique. 2009. http://ieeexplore.ieee.org/slamp/slamp.jsp?tp=&arnumber=5402583, 6 pgs.
U.S. Appl. No. 13/170,660, Amendment and Response filed Feb. 2, 2015, 16 pages.
U.S. Appl. No. 13/170,660, Amendment and Response filed May 5, 2017, 14 pages.
U.S. Appl. No. 13/170,660, Amendment and Response filed Jun. 4, 2015, 13 pages.
U.S. Appl. No. 13/170,660, Amendment and Response filed Jul. 28, 2014, 17 pages.
U.S. Appl. No. 13/170,660, Appeal Brief filed Jul. 25, 2016, 26 pages.
U.S. Appl. No. 13/170,660, Office Action dated Jan. 28, 2014, 22 pages.
U.S. Appl. No. 13/170,660, Office Action dated Jan. 5, 2017, 22 pages.
U.S. Appl. No. 13/170,660, Office Action dated Oct. 2, 2014, 24 pages.
U.S. Appl. No. 13/170,660, Office Action dated Mar. 4, 2015, 25 pages.
U.S. Appl. No. 13/170,660, Office Action dated Jul. 26, 2017, 22 pages.
U.S. Appl. No. 13/170,660, Office Action dated Sep. 18, 2015, 24 pages.
"Office Action Issued in Korean Patent Application No. 10-2013-7034644", dated Mar. 7, 2018, 10 Pages.
U.S. Appl. No. 14/714,109, Office Action dated Feb. 7, 2018, 12 pages.
U.S. Appl. No. 13/170,660, Amendment and Response filed Oct. 26, 2017, 14 pages.
U.S. Appl. No. 13/170,660, Office Action dated Jan. 4, 2018, 16 pages.
Colombian Office Action Issued in Colombian Patent Application No. NC2017/0011525, dated Nov. 15, 2017, 3 Pages.
"Office Action Issued in Colombian Patent Application No. NC2017/0011540", dated Nov. 15, 2017, 4 Pages.
"Office Action Issued in Korean Patent Application No. 10-2013-7034644", dated Aug. 23, 2018, 4 Pages. (W/O English Translation).
"Final Office Action Issued in U.S. Appl. No. 13/170,660", dated Jul. 2, 2018, 17 Pages.
"Final Office Action Issued in U.S. Appl. No. 14/714,109", dated Aug. 16, 2018, 16 Pages.

(56) References Cited

OTHER PUBLICATIONS

Abraão, et al., "A XBRL Financial Virtual Assistant", In Proceedings of the 11th International Conference on Internet and Web Applications and Services, May 22, 2016, pp. 64-72.

Kadhim, et al., "A Multi-intelligent Agent Architecture for Knowledge Extraction: Novel Approaches for Automatic Production Rules Extraction", In International Journal of Multimedia and Ubiquitous Engineering, vol. 9, Issue 2, Mar. 2014, pp. 95-114.

"Office Action Issued in Columbian Patent Application No. NC2017/0011525", dated Jun. 27, 2018, 17 Pages. (W/O English Translation).

"Office Action Issued in Columbian Patent Application No. NC2017/0011540", dated Jun. 27, 2018, 19 Pages. (W/O English Translation).

Schlaefer, et al., "Statistical Source Expansion for Question Answering", In Proceedings of the 20th ACM International conference on Information and knowledge management., 2009, 171 Pages.

Signer, et al., "A Personal Assistant for Web Database Caching", In International Conference on Advanced Information Systems Engineering, Jun. 5, 2000, 15 Pages.

"Non Final Office Action Issued in U.S. Appl. No. 13/170,660", dated Jan. 11, 2019, 15 Pages.

"Office Action Issued in European Patent Application No. 16723208.1", dated Jan. 8, 2019, 8 Pages.

"Office Action Issued in Chilean Patent Application No. 2017/002832", dated Nov. 19, 2018, 2 Pages.

"Office Action Issued in Columbian Patent Application No. NC2017/0011525", dated Nov. 20, 2018, 19 Pages.

"Office Action Issued in Chilean Patent Application No. 2017/02839", dated Nov. 14, 2018, 6 Pages.

"First Office Action and Search Report Issued in Chinese Patent Application No. 201610319721.8", dated Jan. 18, 2019, 11 Pages.

"Office Action Issued in European Patent Application No. 12804978.0", dated Feb. 26, 2019, 7 Pages.

"Office Action Issued in Chilean Patent Application No. 2017/002832", dated Mar. 14, 2019, 7 Pages.

"Office Action Issued in Chilean Patent Application No. 2839-2017", dated Mar. 14, 2019, 7 Pages.

\* cited by examiner

|  | COMMITMENT | REQUEST |
|---|---|---|
| OUTGOING MESSAGE | COMMITMENT TO OTHER FROM USER | REQUEST TO OTHER FROM USER |
| INCOMING MESSAGE | COMMITMENT TO USER FROM OTHER | REQUEST TO USER FROM OTHER |

AUTOMATIC EXTRACTION OF COMMITMENTS AND REQUESTS FROM COMMUNICATIONS AND CONTENT

BACKGROUND

Electronic communications have become an important form of social and business interactions. Such electronic communications include email, calendars, SMS text messages, voice mail, images, videos, and other digital communications and content, just to name a few examples. Electronic communications are generated automatically or manually by users on any of a number of computing devices.

SUMMARY

This disclosure describes techniques and architectures for identifying requests and commitments in electronic communications, such as messages between or among users. For example, an email exchange between two people may include text from a first person sending a request to a second person to perform a task, and the second person responding with a message indicating a commitment to perform the task. The email exchange may convey enough information for the system to automatically determine the presence of the request to perform the task and/or the commitment by the recipient to perform the task, as well as to determine the identities of the person originating the request and the person or people responding with the commitment to perform or contribute to the completion of the task. If the email exchange does not convey enough information to determine the presence of the request and/or the commitment, the system may query other sources of information that may be related to one or more portions of the email exchange. For example, the system may examine a longer history of messages such as that contained in maintained "threads" of email, or may query a calendar or database of one or both of the authors of the email exchange for additional information. The system may also seek confirmation from one or more of the users involved in the communications about the existence of a potential request or of a commitment to perform a task given levels of uncertainty about either.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic (e.g., Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs)), and/or other technique(s) as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
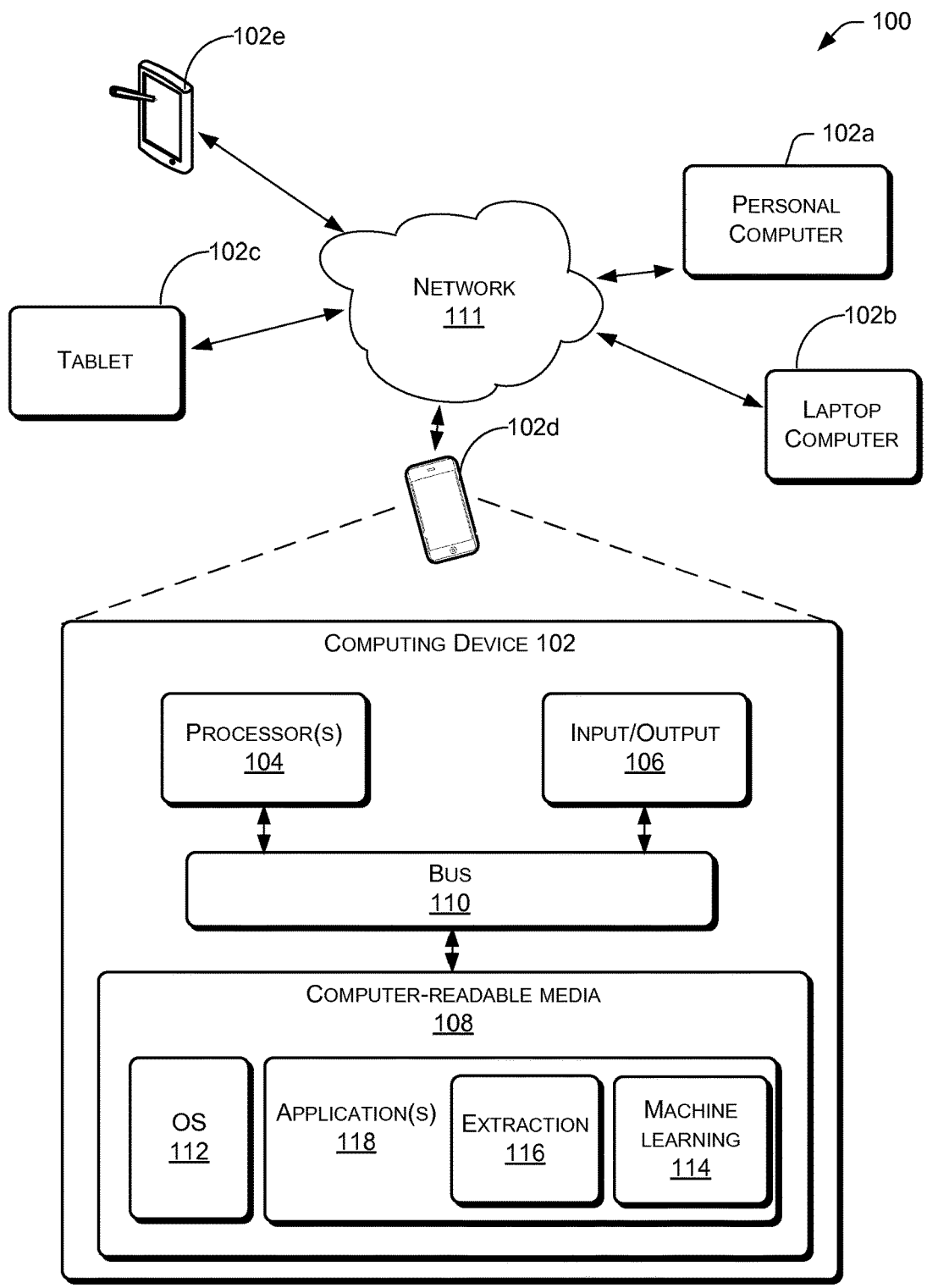
FIG. 1 is a block diagram depicting an example environment in which techniques described herein may be implemented.

Various examples describe techniques and architectures for a system that performs, among other things, extraction of tasks from electronic communications, such as messages between or among one or more users (e.g., a single user may send a message to oneself or to one or more other users). For example, an email exchange between two people may include text from a first person sending a request to a second person to perform a task, and the second person making a commitment (e.g., agreeing) to perform the task. The email exchange may convey enough information for the system to automatically determine the presence of the request to perform the task and/or the commitment to perform the task. In some implementations, the email exchange does not convey enough information to determine the presence of the request and/or the commitment. Whether or not this is the case, the system may query other sources of information that may be related to one or more portions of the email exchange. For example, the system may examine other messages exchanged by one or both of the authors of the email exchange or by other people. The system may also examine larger corpora of email and other messages. Beyond other messages, the system may query a calendar or database of one or both of the authors of the email exchange for additional information. In some implementations, the system may query traffic or weather conditions at respective locations of one or both of the authors.

Herein, "extract" is used to describe determining a request or commitment in a communication. For example, a system may extract a request or commitment from a series of text messages. Here, the system is determining or identifying a request or commitment from the series of text messages, but is not necessarily removing the request or the commitment from the series of text messages. In other words, "extract" in the context used herein, unless otherwise described for particular examples, does not mean to "remove".

Herein, a process of extracting a request and/or commitment from a communication may be described as a process of extracting "task content". In other words, "task content" as described herein refers to one or more requests, one or more commitments, and/or projects comprising combinations of requests and commitments that are conveyed in the meaning of the communication. In various implementations, interplay between commitments and requests may be identified and extracted. Such interplay, for example, may be where a commitment to a requester generates one or more requests directed to the requester and/or third parties (e.g., individuals, groups, processing components, and so on. For example, a commitment to a request from an engineering manager to complete a production yield analysis may generate secondary requests directed to a manufacturing team for production data.

In various implementations, a process may extract a fragment of text containing a commitment or request. For example, a paragraph may include a commitment or request in the second sentence of the paragraph. Additionally, the process may extract the text fragment, sentence, or paragraph that contains the commitment or request, such as the third sentence or various word phrases in the paragraph.

In various implementations, a process may augment extracted task content (e.g., requests or commitments) with identification of people and one or more locations associated with the extracted task content. For example, an extracted request may be stored or processed with additional information, such as identification of the requester and/or "requestee(s)", pertinent location(s), times/dates, and so on.

Once identified and extracted by a computing system, task content (e.g., the proposal or affirmation of a commitment or request) of a communication may be further processed or analyzed to identify or infer semantics of the commitment or request including: identifying the primary owners of the request or commitment (e.g., if not the parties in the communication); the nature of the task content and its properties (e.g., its description or summarization); specified or inferred pertinent dates (e.g., deadlines for completing the commitment or request); relevant responses such as initial replies or follow-up messages and their expected timing (e.g., per expectations of courtesy or around efficient communications for task completion among people or per an organization); and information resources to be used to satisfy the request. Such information resources, for example, may provide information about time, people, locations, and so on. The identified task content and inferences about the task content may be used to drive automatic (e.g., computer generated) services such as reminders, revisions (e.g., and displays) of to-do lists, appointments, meeting requests, and other time management activities. In some examples, such automatic services may be applied during the composition of a message (e.g., typing an email or text), reading the message, or at other times, such as during offline processing of email on a server or client device. The initial extraction and inferences about a request or commitment may also invoke automated services that work with one or more participants to confirm or refine current understandings or inferences about the request or commitment and the status of the request or commitment based, at least in part, on the identification of missing information or of uncertainties about one or more properties detected or inferred from the communication.

In some examples, task content may be extracted from multiple forms of communications, including digital content capturing interpersonal communications (e.g., email, SMS text, instant messaging, phone calls, posts in social media, and so on) and composed content (e.g., email, note-taking and organizational tools such as OneNote® by Microsoft Corporation of Redmond, Wash., word-processing documents, and so on).

As described below, some example techniques for identifying and extracting task content from various forms of electronic communications may involve language analysis of content of the electronic communications, which human annotators may annotate as containing commitments or requests. Human annotations may be used in a process of generating a corpus of training data that is used to build and to test automated extraction of commitments or requests and various properties about the commitments or requests. Techniques may also involve proxies for human-generated labels (e.g., based on email engagement data or relatively sophisticated extraction methods). For developing methods used in extraction systems or for real-time usage of methods for identifying and/or inferring tasks or commitments and their properties, analyses may include natural language processing (NLP) analyses at different points along a spectrum of sophistication. For example, an analysis having a relatively low-level of sophistication may involve identifying key words based on simple word breaking and stemming. An analysis having a relatively mid-level of sophistication may involve consideration of larger analyses of sets of words ("bag of words"). An analysis having a relatively high-level of sophistication may involve sophisticated parsing of sentences in communications into parse trees and logical forms. Techniques for identifying and extracting task content may involve identifying attributes or "features" of components of messages and sentences of the messages. Such techniques may employ such features in a training and testing paradigm to build a statistical model to classify components of the message. For example, such components may comprise sentences or the overall message as containing a request and/or commitment and also identify and/or summarize the text that best describes the request and/or commitment.

In some examples, techniques for extraction may involve a hierarchy of analysis, including using a sentence-centric approach, consideration of multiple sentences in a message, and global analyses of relatively long communication threads. In some implementations, such relatively long communication threads may include sets of messages over a period of time, and sets of threads and longer-term communications (e.g., spanning days, weeks, months, or years). Multiple sources of content associated with particular communications may be considered. Such sources may include histories and/or relationships of/among people associated with the particular communications, locations of the people during a period of time, calendar information of the people, and multiple aspects of organizations and details of organizational structure associated with the people.

In some examples, techniques may directly consider requests or commitments identified from components of content as representative of the requests or commitments, or may be further summarized. Techniques may extract other information from a sentence or larger message, including relevant dates (e.g., deadlines on which requests or commitments are due), locations, urgency, time-requirements, task subject matter (e.g., a project), and people. In some implementations, a property of extracted task content is determined by attributing commitments and/or requests to particular authors of a message. This may be particularly useful in the case of multi-party emails with multiple recipients, for example.

Beyond text of a message, techniques may consider other information for extraction and summarization, such as images and other graphical content, the structure of the message, the subject header, length of the message, position of a sentence or phrase in the message, date/time the message was sent, and information on the sender and recipients of the message, just to name a few examples. Techniques may also consider features of the message itself (e.g., the number of recipients, number of replies, overall length, and so on) and the context (e.g., day of week). In some implementations, a technique may further refine or prioritize initial analyses of candidate messages/content or resulting extractions based, at least in part, on the sender or recipient(s) and histories of communication and/or of the structure of the organization.

In some examples, techniques may include analyzing features of various communications beyond a current communication (e.g., email, text, and so on). For example, techniques may consider interactions between or among commitments and requests, such as whether an early portion of a communication thread contains a commitment or request, the number of commitments and/or requests previously made between two (or more) users of the communication thread, and so on.

In some examples, techniques may include analyzing features of various communications that include conditional task content commitments or requests. For example, a conditional commitment may be "If I see him, I'll let him know." A conditional request may be "If the weather is clear tomorrow, please paint the house."

In some examples, techniques may include augmenting extracted task content (e.g., commitments and/or requests) with additional information such as deadlines, identification (e.g., names, ID number, and so on) of people associated with the task content, and places that are mentioned in the task content.

In some examples, a computing system may construct predictive models for identifying and extracting requests and commitments and related information using machine learning procedures that operate on training sets of annotated corpora of sentences or messages (e.g., machine learning features). In other examples, a computing system may use relatively simple rule-based approaches to perform extractions and summarization.

In some examples, a computing system may explicitly notate task content extracted from a message in the message itself. In various implementations, a computing system may flag messages containing requests and commitments in multiple electronic services and experiences, which may include products or services such as revealed via products and services provided by Windows®, Cortana®, Outlook®, Outlook Web App® (OWA), Xbox®, Skype®, Lync® and Band®, all by Microsoft Corporation, and other such services and experiences from others. In various implementations, a computing system may extract requests and commitments from audio feeds, such as from phone calls or voicemail messages, SMS images, instant messaging streams, and verbal requests to digital personal assistants, just to name a few examples.

In some examples, a computing system may learn to improve predictive models and summarization used for extracting task content by implicit and explicit feedback by users. For example, such feedback may include user input (e.g., in response to displayed extracted task content) about whether extracted content is correct or incorrect. Such feedback may be quantified and/or stored by the computer system and subsequently applied to predictive models, for example.

Various examples are described further with reference to FIGS. 1-10.

The environment described below constitutes but one example and is not intended to limit the claims to any one particular operating environment. Other environments may be used without departing from the spirit and scope of the claimed subject matter.

FIG. 1 illustrates an example environment 100 in which example processes involving task extraction as described herein can operate. In some examples, the various devices and/or components of environment 100 include a variety of computing devices 102. By way of example and not limitation, computing devices 102 may include devices 102a-102e. Although illustrated as a diverse variety of device types, computing devices 102 can be other device types and are not limited to the illustrated device types. Computing devices 102 can comprise any type of device with one or multiple processors 104 operably connected to an input/output interface 106 and computer-readable media 108, e.g., via a bus 110. Computing devices 102 can include personal computers such as, for example, desktop computers 102a, laptop computers 102b, tablet computers 102c, telecommunication devices 102d, personal digital assistants (PDAs) 102e, electronic book readers, wearable computers (e.g., smart watches, personal health tracking accessories, etc.), automotive computers, gaming devices, etc. Computing devices 102 can also include, for example, server computers, thin clients, terminals, and/or work stations. In some examples, computing devices 102 can include components for integration in a computing device, appliances, or other sorts of devices.

In some examples, some or all of the functionality described as being performed by computing devices 102 may be implemented by one or more remote peer computing devices, a remote server or servers, or distributed computing resources, e.g., via cloud computing. In some examples, a computing device 102 may comprise an input port to receive electronic communications. Computing device 102 may further comprise one or multiple processors 104 to access various sources of information related to or associated with particular electronic communications. Such sources may include electronic calendars and databases of histories or personal information about authors of messages included in the electronic communications, just to name a few examples. In some implementations, an author has to "opt-in" or take other affirmative action before any of the multiple processors 104 can access personal information of the author. In some examples, one or multiple processors 104 may be configured to extract task content from electronic communications. One or multiple processors 104 may be hardware processors or software processors. As used herein, a processing unit designates a hardware processor.

In some examples, as shown regarding device 102d, computer-readable media 108 can store instructions executable by the processor(s) 104 including an operating system (OS) 112, a machine learning module 114, an extraction module 116 and programs or applications 118 that are loadable and executable by processor(s) 104. The one or more processors 104 may include one or more central processing units (CPUs), graphics processing units (GPUs), video buffer processors, and so on. In some implementations, machine learning module 114 comprises executable code stored in computer-readable media 108 and is executable by processor(s) 104 to collect information, locally or remotely by computing device 102, via input/output 106. The information may be associated with one or more of applications 118. Machine learning module 114 may selectively apply any of a number of machine learning decision models stored in computer-readable media 108 (or, more particularly, stored in machine learning 114) to apply to input data.

In some implementations, extraction module 116 comprises executable code stored in computer-readable media 108 and is executable by processor(s) 104 to collect information, locally or remotely by computing device 102, via input/output 106. The information may be associated with one or more of applications 118. Extraction module 116 may selectively apply any of a number of statistical models or predictive models (e.g., via machine learning module 114) stored in computer-readable media 108 to apply to input data.

Though certain modules have been described as performing various operations, the modules are merely examples and the same or similar functionality may be performed by a greater or lesser number of modules. Moreover, the functions performed by the modules depicted need not necessarily be performed locally by a single device. Rather, some operations could be performed by a remote device (e.g., peer, server, cloud, etc.).

Alternatively, or in addition, some or all of the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

In some examples, computing device 102 can be associated with a camera capable of capturing images and/or video and/or a microphone capable of capturing audio. For example, input/output module 106 can incorporate such a camera and/or microphone. Images of objects or of text, for example, may be converted to text that corresponds to the content and/or meaning of the images and analyzed for task content. Audio of speech may be converted to text and analyzed for task content.

Computer readable media includes computer storage media and/or communication media. Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media embodies computer readable instructions, data structures, program modules, or other data in a modulated data signal, such as a carrier wave, or other transmission mechanism. As defined herein, computer storage media does not include communication media. In various examples, memory 108 is an example of computer storage media storing computer-executable instructions. When executed by processor(s) 104, the computer-executable instructions configure the processor(s) to, among other things, analyze content of an individual electronic message, where the electronic message is (i) received among the electronic communications, (ii) entered by a user via a user interface, or (iii) retrieved from memory; and based, at least in part, on the analyzing the content, extract, from the electronic message, text corresponding to a request or to a commitment.

In various examples, an input device of or connected to input/output (I/O) interfaces 106 may be a direct-touch input device (e.g., a touch screen), an indirect-touch device (e.g., a touch pad), an indirect input device (e.g., a mouse, a keyboard, a camera or camera array, etc.), or another type of non-tactile device, such as an audio input device.

Computing device(s) 102 may also include one or more input/output (I/O) interfaces 106, which may comprise one or more communications interfaces to enable wired or wireless communications between computing device 102 and other networked computing devices involved in extracting task content, or other computing devices, over network 111. Such communications interfaces may include one or more transceiver devices, e.g., network interface controllers (NICs) such as Ethernet NICs or other types of transceiver devices, to send and receive communications over a network. Processor 104 (e.g., a processing unit) may exchange data through the respective communications interfaces. In some examples, a communications interface may be a PCIe transceiver, and network 111 may be a PCIe bus. In some examples, the communications interface may include, but is not limited to, a transceiver for cellular (3G, 4G, or other), WI-FI, Ultra-wideband (UWB), BLUETOOTH, or satellite transmissions. The communications interface may include a wired I/O interface, such as an Ethernet interface, a serial interface, a Universal Serial Bus (USB) interface, an INFINIBAND interface, or other wired interfaces. For simplicity, these and other components are omitted from the illustrated computing device 102. Input/output (I/O) interfaces 106 may allow a device 102 to communicate with other devices such as user input peripheral devices (e.g., a keyboard, a mouse, a pen, a game controller, a voice input device, a touch input device, gestural input device, and the like) and/or output peripheral devices (e.g., a display, a printer, audio speakers, a haptic output, and the like).

Figure 2:
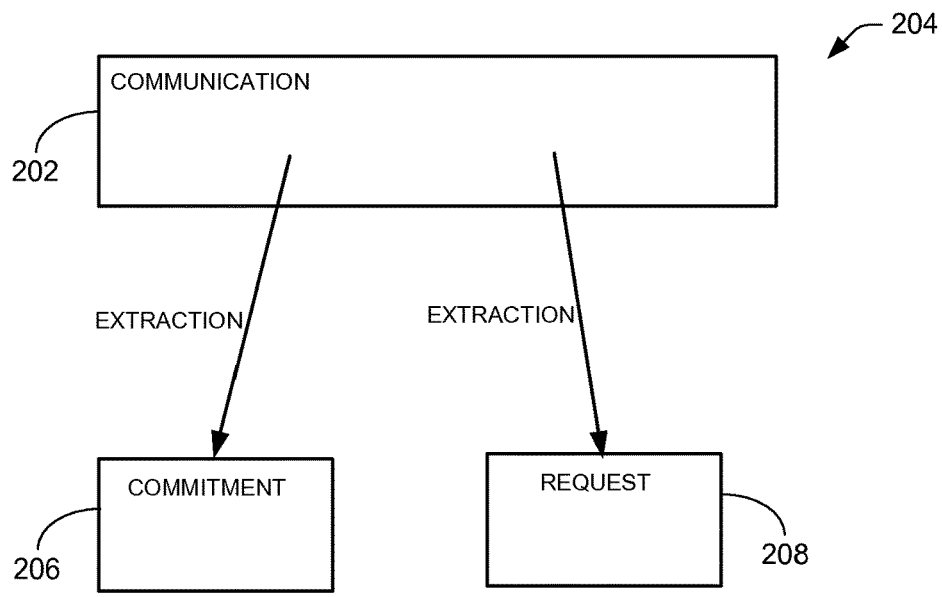
FIG. 2 is a block diagram illustrating electronic communication subjected to an example task extraction process.

FIG. 2 is a block diagram illustrating electronic communication 202 subjected to an example task extraction process 204. For example, process 204 may involve any of a number of techniques for detecting whether a commitment 206 or request 208 has been made in incoming or outgoing communications. Process 204 may also involve techniques for automatically marking, annotating, or otherwise identifying the message as containing a commitment or request. In some examples, process 204 may include techniques that extract a summary (not illustrated) of commitments or requests for presentation and follow-up tracking and analysis. Commitments 206 or requests 208 may be extracted from multiple forms of content of electronic communication 202. Such content may include interpersonal communications such as email, SMS text or images, instant messaging, posts in social media, meeting notes, and so on. Such content may also include content composed using email applications or word-processing applications, among other possibilities.

In some examples, task extraction process 204 may extract task content regarding third parties. For example, electronic communication 202, such as an email, may include a commitment by a first person answering the email. This commitment may be a first-person commitment. This commitment may, however, be a third-person commitment, which is a commitment by the first person (answering the email) on behalf of another person. For example, the first person may be a supervisor establishing a commitment to a vice president for a subordinate to perform a task. For a particular example, a third-person commitment may be "My assistant John will get a report to you later today."

In some examples, task extraction process 204 may extract task content from electronic communication 202, such as a message, based at least in part on personal and/or professional relationships between or among authors of the message (e.g., such as an email thread) or people associated with content of the message (e.g., such as people mentioned in the message). Task extraction process 204 may also extract task content from a message based, at least in part, on previous communications between or among authors of the message or people associated with content of the message.

In some examples, task extraction process 204 may (i) analyze content of electronic communication 202 and (ii) automatically extract a request or a commitment from the content of the electronic communication in real time. For example, during task extraction process 204, a system performing the task extraction process may immediately ask for confirmation about a commitment and/or provide real-time support to a user by notifying the user of possible time conflicts or other commitments to prevent the user from overpromising. In a particular example, the system may serve to assist with time management and inform the user about being overloaded by displaying the message "You probably can't do this, you've already committed to too many things this week."

Figure 3:
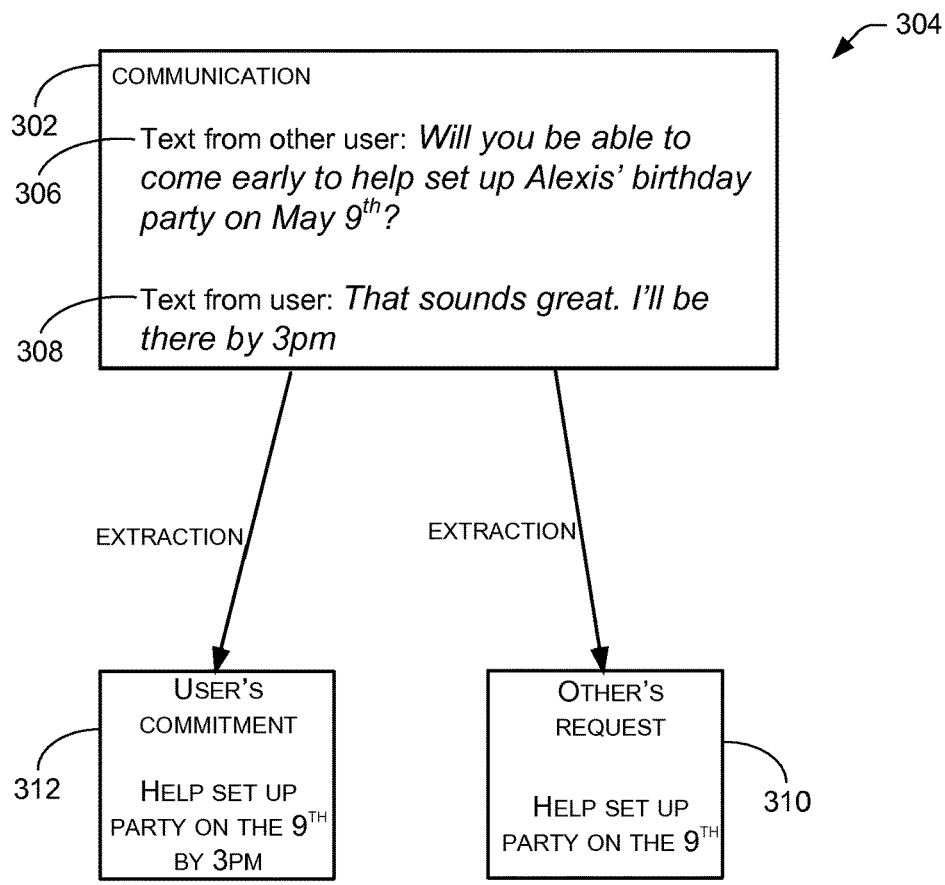
FIG. 3 is a block diagram illustrating an electronic communication that includes an example text thread and a task extraction process of a request and a commitment.

FIG. 3 is a block diagram illustrating an electronic communication 302 that includes an example text thread and a task extraction process 304 of a request or a commitment. For example, communication 302, which may be a text message to a user received on a computing device of the user from another user, includes text 306 from the other user and text 308 from the user. Task extraction process 304 includes analyzing content (e.g., text 306 and text 308) of communication 302 and determining (i) a commitment of the user or the other user and/or (ii) a request by the user or the other user. In the example illustrated in FIG. 3, text 306 by the other user includes a request 310 that the user help set up Alexis' birthday party on May $9^{th}$. Text 308 by the user includes a commitment 312 that the user intends to help set up Alexis' birthday party on May $9^{th}$, by 3 pm. Task extraction process 304 may determine the request and commitment by any of a number of techniques involving analyzing text 306 and text 308. In some implementations, if the text is insufficient for determining a request or commitment (e.g., "missing" information or highly uncertain information), then task extraction process 304 may query any of a number of data sources. For example, if text 306 did not include the date of Alexis' birthday party (e.g., the other user may assume that the user remembers the date), then task extraction process 304 may query a calendar of the user or the other user for the birthday date.

In various examples, task extraction process 304 may determine likelihood (e.g., an inferred probability) or other measure of confidence that an incoming or outgoing message (e.g., email, text, etc.) contains a request or commitment intended for/by the recipient/sender. Such confidence or likelihood may be determined, at least in part, from calculated probabilities that one or more components of the message, or summarizations of the components, are valid requests or commitments.

In some examples, task extraction process 304 may determine a measure of confidence of a commitment, where a low-confidence commitment is one for which the user is not likely to fulfill the commitment and a high-confidence commitment is one for which the user is highly likely to fulfill the commitment. Likelihood (e.g., probability) or other measures of confidence may be used to capture how certain task extraction process 304 is regarding an extracted commitment based, at least in part, on use of a statistical classifier, for example. Confidence of a commitment may be useful for subsequent services such as reminders, revisions of to-do lists, appointments, meeting requests, and other time management activities. Determining confidence of a commitment may be based, at least in part, on history of events of the user (e.g., follow-through of past commitments, and so on) and/or history of events of the other user and/or personal information (e.g., age, sex, age, occupation, frequent traveler, and so on) of the user or other user. For example, task extraction process 304 may query such histories. In some implementations, either or all of the users have to "opt-in" or take other affirmative action before task extraction process 304 may query personal information of the users. Task extraction process 304 may assign a relatively high confidence for a commitment by the user if such histories demonstrate that the user, for example, has attended the last several of Alexis' birthdays, tends to attend many other people's birthdays, has a relatively close relationship to Alexis and/or the other user, and so on. Determining confidence of a commitment may also be based, at least in part, on key words or terms in text 306 and/or text 308. For example, "birthday party" generally has positive and desirable implications (e.g., a party, in contrast to a work task), so that a commitment may be relatively strong. On the other hand, in another example that involves a commitment to writing an accounting report, such an activity is generally undesirable, and such a commitment may thus be assigned a relatively low confidence. If such a commitment to writing an accounting report is associated with a job (e.g., occupation) of the user, however, then such a commitment may be assigned a relatively high confidence. Task extraction process 304 may weigh a number of such scenarios and factors to determine the confidence of a commitment. For example, task extraction process 304 may determine confidence (e.g., importance) of a request or a commitment in a message based, at least in part, on content related to the electronic message.

Figures 4, 5:
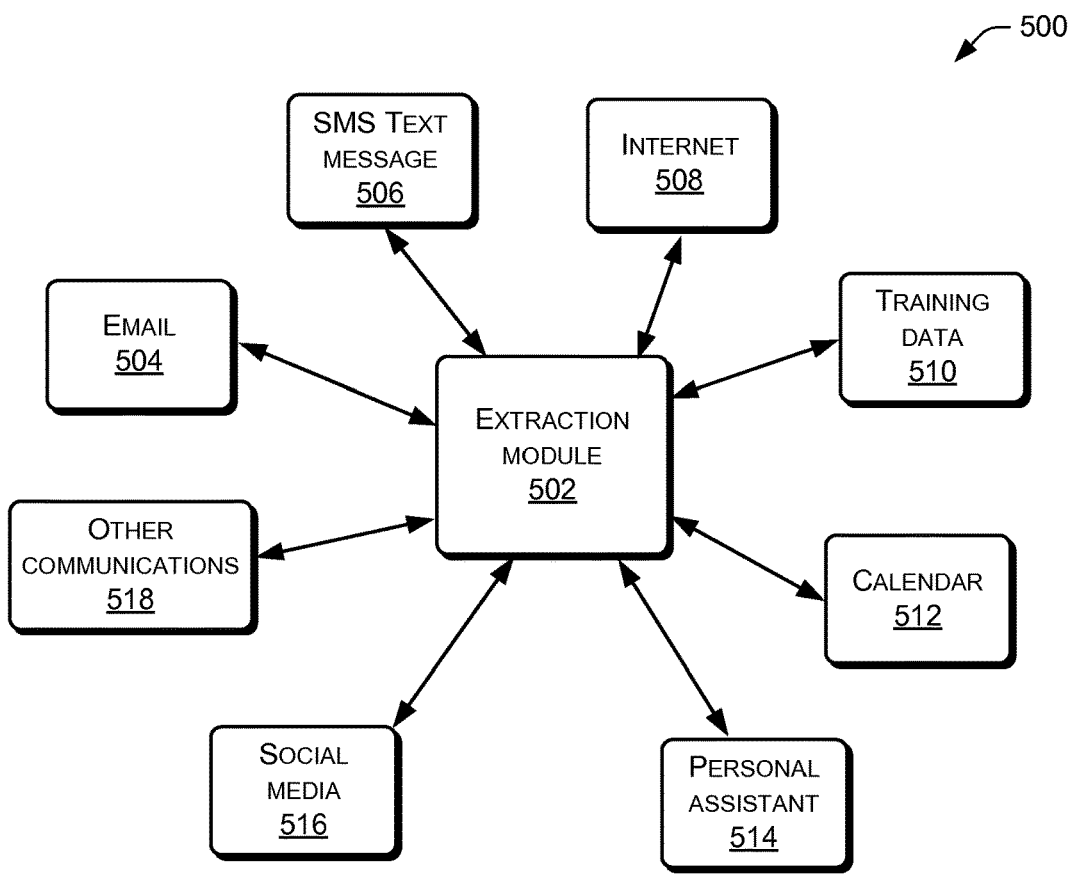
FIG. 4 is a table of example relations among messages, commitments and requests.
FIG. 5 is a block diagram of multiple information sources that may communicate with an example extraction module.

FIG. 4 is a table 400 of example relations among messages and task content. In particular, such task content includes commitments and/or requests, either of which may be generated (e.g., automatically by an application or manually written) by a user of a computing device or "other user entity", which may be one or more people on one or more computing devices. In some examples, the other user entity may be the user, who may send a message to him or herself. In other examples, the user and/or the other user entity may be any person (e.g., a delegate, an assistant, a supervisor, etc.) or a machine (e.g., a processor-based system configured to receive and perform instructions). Table 400 illustrates outgoing messages that are generated by the user of the computing device and transmitted to the other user entity, and incoming messages that are generated by the other user entity and received by the user of the computing device.

Examples of commitments that may be extracted from outgoing or incoming messages include: "I will prepare the documents and send them to you on Monday." "I will send Mr. Smith the check by end of day Friday." "I'll do it." "I'll get back to you." "Will do." And so on. The latter examples demonstrate that a commitment (or statement thereof) need not include a time or deadline. Examples of requests that may be extracted from incoming or outgoing messages include: "Can you make sure to leave the key under the mat?" "Let me know if you can make it earlier for dinner." "Can you get the budget analysis done by end of month?" And so on. A request need not be in the form of a direct question. For example, "Don't forget to get your report in by 5 pm" is not a direct question, yet this statement poses a request.

Table 400 includes four particular cases of tasks included in messages. One case is an outgoing message that includes a commitment to the other user entity by the user. Another case is an outgoing message that includes a request to the other user entity by the user. Yet another case is an incoming message that includes a commitment to the user from the other user entity. Still another case is an incoming message that includes a request from the other user entity to the user. Processes for extracting task content from the messages may differ from one another depending, at least in part, on which of the particular cases is being processed. Such processes may be performed by the computing device of the user or a computing system (e.g., server) in communication with the computing device. For example, a process applied to the case where an incoming message includes a commitment to the user from the other user entity may involve querying various data sources to determine confidence (e.g., sincerity, reliability, worthiness) of the commitment of the other user entity. Such various data sources may include personal data or history of the other user entity. In some examples, data sources may be memory associated with a processing component of a device, such as a memory device electronically coupled to a processor via a bus. In some examples, history of actions (cancelling meetings or failing to follow-through with tasks) by the other user entity may be indicative of the reliability of the commitment of the other user entity. In some implementations, the user and/or the other user entity has to "opt-in" or take other affirmative action before processes can access personal information of the user and/or the other user entity.

As another example, a process applied to the case where an outgoing message includes a request to the other user entity by the user may involve querying various data sources to determine likelihood of outcome of the other user entity responding with a strong (e.g., sincere, reliable, worthy) commitment to the request of the user. Such various data sources (which need not be external to the device(s) performing the process) may include personal data or history of the other user entity. For example, history of actions (cancelling meetings or failing to follow-through with tasks) by the other user entity may be indicative of the likelihood (or lack thereof) that the other user entity will accept or follow-through with a commitment to the request of the user.

On the other hand, a process applied to the case where an incoming message includes a request from the other user entity to the user may involve querying various data sources to determine importance of the request (and concomitantly, importance of a commitment to the request). For example, if the other user entity is a supervisor of the user then the request is likely to be relatively important. Accordingly, the process may query various data sources that include personal and/or professional data of the other user entity to determine is the other user entity is a supervisor, subordinate, co-worker, friend, family, and so on.

In another example, a process applied to the case where an outgoing message includes a commitment to the other user entity by the user may involve querying various data sources to determine importance of the commitment. For example, if the other user entity is a supervisor of the user then the commitment is likely to be relatively important. Accordingly, the process may query various data sources that include personal and/or professional data of the other user entity to determine is the other user entity is a supervisor, subordinate, co-worker, friend, family, and so on.

FIG. 5 is a block diagram of an example system 500 that includes an extraction module 502 in communication with a number of entities 504-518. Such entities may include host applications (e.g., Internet browsers, SMS text editors, email applications, electronic calendar functions, and so on), databases or information sources (e.g., personal histories of individuals, organizational information of businesses or agencies, third party data aggregators that might provide data as a service, and so on), just to name a few examples. Extraction module 502 may be the same as of similar to extraction module 116 in computing device 102, illustrated in FIG. 1, for example. Some of the entities 504-518, such as (just to name a few) training data 510, calendar 512, and data collected from social media 516 may be stored in a memory device associated with extraction module 502. For example, the memory device may be directly connected (e.g., wired) to extraction module 502 (e.g., which may be a processing component). In another example, the memory device may be wirelessly and/or remotely connected (e.g., by one or more remote peer computing devices, a remote server or servers, or distributed computing resources, e.g., via cloud computing) to extraction module 502.

Extraction module 502 may be configured to analyze content of communications, and/or data or information provided by entities 504-518 by applying any of a number of language analysis techniques. For example, extraction module 502 may be configured to analyze content of communications provided by email entity 504, SMS text message entity 506, and so on. Extraction module 502 may also be configured to analyze data or information provided by Internet entity 508, a machine learning entity providing training data 510, email entity 504, calendar entity 512, and so on. Extraction module 502 may analyze content by applying language analysis to information or data collected from any of entities 504-518.

Double-ended arrows in FIG. 5 indicate that data or information may flow in either direction among entities 504-518 and extraction module 502. For example, data or information flowing from extraction module 502 to any of entities 504-518 may be part of a query generated by the extraction module to query the entities. Such a query may be used by extraction module 502 to determine one or more meanings of content provided by any of the entities.

In some examples, extraction module 502 may receive content of an email exchange (e.g., a communication) among a number of users from email entity 504. The extraction module may analyze the content to determine one or more meanings of the content. Analyzing content may be performed by any of a number of techniques to determine meanings of elements of the content, such as words, phrases, sentences, metadata (e.g., size of emails, date created, and so on), images, and how and if such elements are interrelated, for example. "Meaning" of content may be how one would interpret the content in a natural language. For example, the meaning of content may include a request for a person to perform a task. In another example, the meaning of content may include a description of the task, a time by when the task should be completed, background information about the task, and so on.

In an optional implementation, the extraction module may query content of one or more data sources, such as social media entity 516, for example. Such content of the one or more data sources may be related (e.g., related by subject, authors, dates, times, locations, and so on) to the content of the email exchange. Based, at least in part, on (i) the one or more meanings of the content of the email exchange and (ii) the content of the one or more data sources, extraction module 502 may automatically extract a request or commitment from the content of the email exchange.

In some examples, extraction module 502 may extract task content using predictive models learned from training data 510 and/or from real-time ongoing communications among the extraction module and any of entities 504-518.

Such predictive models may infer that an outgoing or incoming communication (e.g., message) or contents of the communication contain a request. Similarly, an outgoing or incoming communication or contents of the communication may contain commitments to perform tasks. The identification and extraction of commitments and requests from incoming or outgoing communications may serve multiple functions that support the senders and receivers of the communications about commitments and requests.

In some examples, extraction module 502 may extract task content using statistical models to identify and extract the proposing and affirming of commitments and requests from email received from email entity 504 or SMS text messages from SMS text message entity 506, just to name a few examples. Statistical models may be based, at least in part, on data or information from any or a combination of entities 504-518.

In some examples, extraction module 502 may extract task content while the author of a message writes the message. For example, such writing may comprise typing an email or text message using any type of text editor or application. In other examples, extraction module 502 may extract task content while a person reads a received message. For example, as the person reads a message, extraction module 502 may annotate portions of the message by highlighting or emphasizing requests or commitments in the text of the message. In some implementations, the extraction module may add relevant information to the message during the reading (or display) of the message. For example, such relevant information may be inferred from additional sources of data or information, such as from entities 504-518. In a particular example, a computer system may display a message that includes a request for the reader to attend a type of class. Extraction module 502 may query Internet 508 to determine that a number of such classes are offered in various locations and at various times of day in an area where the reader resides (e.g., which may be inferred from personal data regarding the reader). Accordingly, the extraction module may generate and provide a list of choices or suggestions to the reader. Such a list may be displayed near text of pertinent portions of the text in response to mouse-over, or may be "permanently" displayed in other portions of the display, for example. In some implementations, the list may include items that are selectable (e.g., by a mouse click) by the reader so that the request will include a time selected by the reader (this time may replace a time "suggested" by the requester and the requester may be automatically notified of the time selected by the reader).

Figure 6:
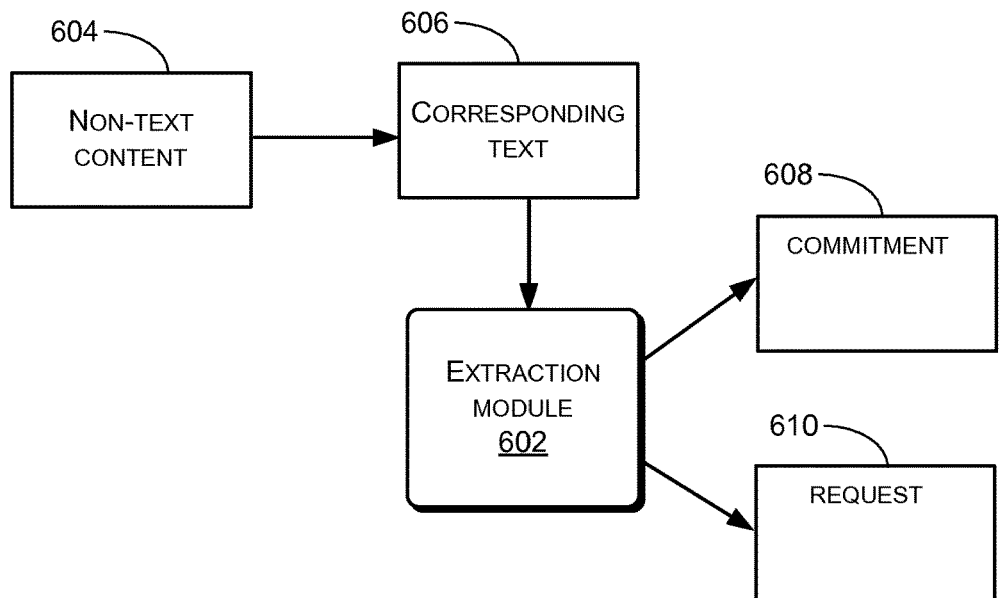
FIG. 6 is a block diagram of an example extraction module acting on non-text communication.

FIG. 6 is a block diagram of an example extraction module 602 that may perform task extraction on non-text content 604, such as audio recordings, images, or video recording. Extraction module 602 may be the same as or similar to extraction module 502 illustrated in FIG. 5. For example, extraction module 602 may be in communication with any or all of entities 504-518.

Non-text content 604 may be translated into corresponding text 606 that describes elements of non-text content. For example, any of a number of image recognition techniques may be used to translate images (or stills of video recordings) to text. Similarly, any of a number of audio-to-text techniques may be used to translate audio recordings to text. Corresponding text 606 may be provided to extraction module 602, which may subsequently extract task content from the corresponding text. Such extracted task content may include commitments 608 and/or requests 610, for example.

A particular illustrative example that demonstrates how extraction module 602 may extract task content from non-text content 604 involves a message including an image of balloons and streamers. Such an image may be translated to text 606 by an image recognition technique that recognizes the image of balloons and streamers and generates text "balloon" and "streamers". Additional text may be included to describe the juxtapositional relationship among the balloons and streamers in the image. Extraction module 602 may query any of a number of entities (e.g., 504-518) to determine context of balloons and streamers relative to the sender of the message. In one example, extraction module 602 may determine (e.g., by searching for a match between the sender and an Internet site) that the message is an advertisement for party supplies. As a consequence, the extraction module may conclude that the message does not include a commitment or request. In another example, extraction module 602 may determine (e.g., by searching for personal information about the sender and the message receiver) that the message is a notice about a birthday party (e.g., such as if the sender or any family members have a birthday coming soon, or the receiver has attended such a birthday in past years, and so on). In such a case, extraction module 602 may consider the image to be a request for the receiver to attend a birthday party. The extraction module may additionally infer the date of the party and thus generate a complete request that includes a task and time to perform the task.

In some examples, a task extraction process performed by extraction module 602 (or 502) may engage a message sender and/or receiver to confirm correctness of commitments or requests extracted by the extraction module. In particular, if extraction module 602 performs an inference with relatively low confidence (e.g., an inference based on nebulous or loosely interrelated information), then the extraction module may prompt a sender and/or receiver for additional information or confirmation regarding tasks in a message. On the other hand, if extraction module 602 performs an inference with relatively high confidence (e.g., an inference based on solid or tightly interrelated information), then the extraction module need not prompt a sender and/or receiver for additional information or confirmation regarding tasks in a message.

In some examples, extraction module 602 may be configured to perform translation of non-text content to corresponding text. In other examples, extraction module 602 may be configured to merely receive corresponding text that has already been translated from non-text content.

Figure 7:
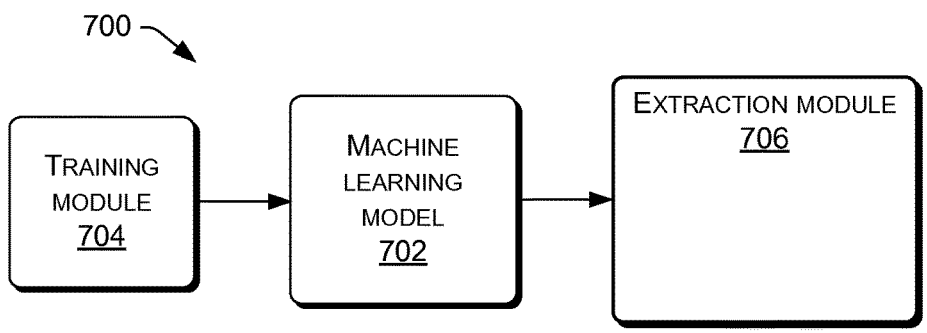
FIG. 7 is a block diagram of an example machine learning system.

FIG. 7 is a block diagram of a machine learning system 700, according to various examples. Machine learning system 700 includes a machine learning model 702 (which may be similar to or the same as machine learning module 114, illustrated in FIG. 1), a training module 704, and an extraction module 706, which may be the same as or similar to extraction module 502, for example. Although illustrated as separate blocks, in some examples extraction module 706 may include machine learning model 702. Machine learning model 702 may receive training data from offline training module 704. For example, training data may include data from memory of a computing system that includes machine learning system 700 or from any combination of entities 502-518, illustrated in FIG. 5. Memory may store a history of requests and commitments received by and/or transmitted to the computing system or a particular user. Data from the memory or the entities may be used to train machine learning model 702. Subsequent to such training, machine learning model 702 may be employed by extraction module 706. Thus, for example, training using data from a history of requests and/or commitments for offline training may act as initial conditions for the machine learning model. Other techniques for training, such as those involving featurization, described below, may be used.

Figure 8:
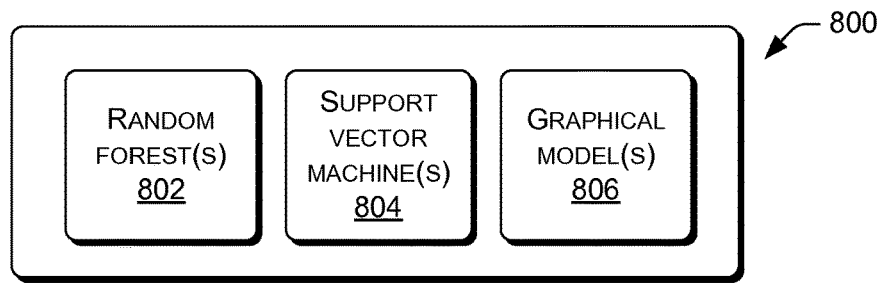
FIG. 8 is a block diagram of example machine learning models.

FIG. 8 is a block diagram of a machine learning model 800, according to various examples. Machine learning model 800 may be the same as or similar to machine learning model 702 shown in FIG. 7. Machine learning model 800 includes any of a number of functional blocks, such as random forest block 802, support vector machine block 804, and graphical models block 806. Random forest block 802 may include an ensemble learning method for classification that operates by constructing decision trees at training time. Random forest block 802 may output the class that is the mode of the classes output by individual trees, for example. Random forest block 802 may function as a framework including several interchangeable parts that can be mixed and matched to create a large number of particular models. Constructing a machine learning model in such a framework involves determining directions of decisions used in each node, determining types of predictors to use in each leaf, determining splitting objectives to optimize in each node, determining methods for injecting randomness into the trees, and so on.

Support vector machine block 804 classifies data for machine learning model 800. Support vector machine block 804 may function as a supervised learning model with associated learning algorithms that analyze data and recognize patterns, used for classification and regression analysis. For example, given a set of training data, each marked as belonging to one of two categories, a support vector machine training algorithm builds a machine learning model that assigns new training data into one category or the other.

Graphical models block 806 functions as a probabilistic model for which a graph is a probabilistic graphical model that shows conditional dependence and independence among random variables. Probabilistic graphical models represent the joint probability distribution over a set of variables of interest. Probabilistic inference algorithms operate on these graphical models to perform inferences based on specific evidence. The inferences provide updates about probabilities of interest, such as the probability that a message or that a particular sentence contains a commitment or request. Learning procedures may construct such probabilistic models from data, with a process that discovers structure from a training set of unstructured information. Learning procedures may also construct such probabilistic models from explicit feedback from users (e.g., confirming whether extracted task information is correct or not). Applications of graphical models, which may be used to infer task content from non-text content, may include information extraction, speech recognition, image recognition, computer vision, and decoding of low-density parity-check codes, just to name a few examples.

Figure 9:
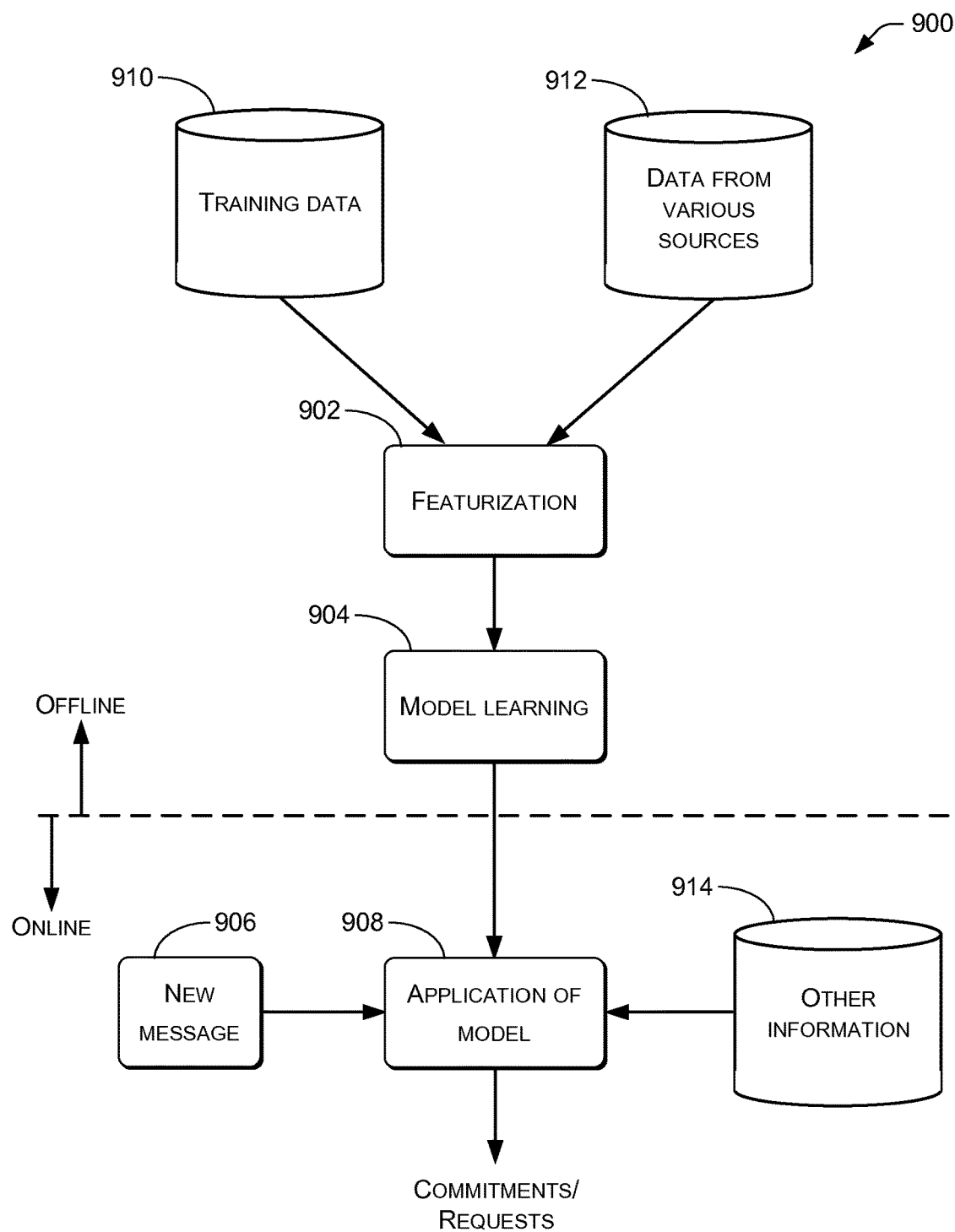
FIG. 9 is a block diagram illustrating example online and offline processes for commitment and request extraction.

FIG. 9 is a block diagram illustrating example online and offline processes 900 involved in commitment and request extraction. Such processes may be performed by a processor (e.g., a processing unit) or a computing device, such as computing device 102 described above. "Offline" refers to a training phase in which a machine learning algorithm is trained using supervised/labeled training data (e.g., a set of emails with commitment and request sentences labeled). "Online" refers to an application of models that have been trained to extract commitments and requests from new (unseen) emails. A featurization process 902 and a model learning process 904 may be performed by the computing device offline or online. On the other hand, receiving a new message 906 and the process 908 of applying the model may occur online.

In some examples, any or all of featurization process 902, model learning process 904, and the process 908 of applying the model may be performed by an extraction module, such as extraction module 116 or 502. In other examples, featurization process 902 and/or model learning process 904 may be performed by a machine learning module (e.g., machine learning module 114, illustrated in FIG. 1), and the process 908 of applying the model may be performed by an extraction module.

In some examples, featurization process 902 may receive training data 910 and data 912 from various sources, such as any of entities 504-518, illustrated in FIG. 5. Featurization process 902 may generate feature sets of text fragments that are helpful for classification. Text fragments may comprise portions of content of one or more communications (e.g., generally a relatively large number of communications of training data 910). For example, text fragments may be words, terms, phrases, or combinations thereof. Model learning process 904 is a machine learning process that generates and iteratively improves a model used in process 908 for extracting task content, such as requests and commitments, from communications. For example, the model may be applied to a new message 906 (e.g., email, text, and so on). A computing device may perform model learning process 904 continuously, from time to time, or periodically, asynchronously from the process 908 of applying the model to new messages 906. Thus, for example, model learning process 904 may update or improve the model offline and independently from online process such as applying the model (or a current version of the model) to a message 906.

The process 908 of applying the model to new messages 906 may involve consideration of other information 914, which may be received from entities such as 504-518, described above. In some implementations, at least a portion of data 912 from other sources may be the same as other information 914. The process 908 of applying the model may result in extraction of task content included in new message 906. Such task content may include commitments and/or requests.

Figure 10:
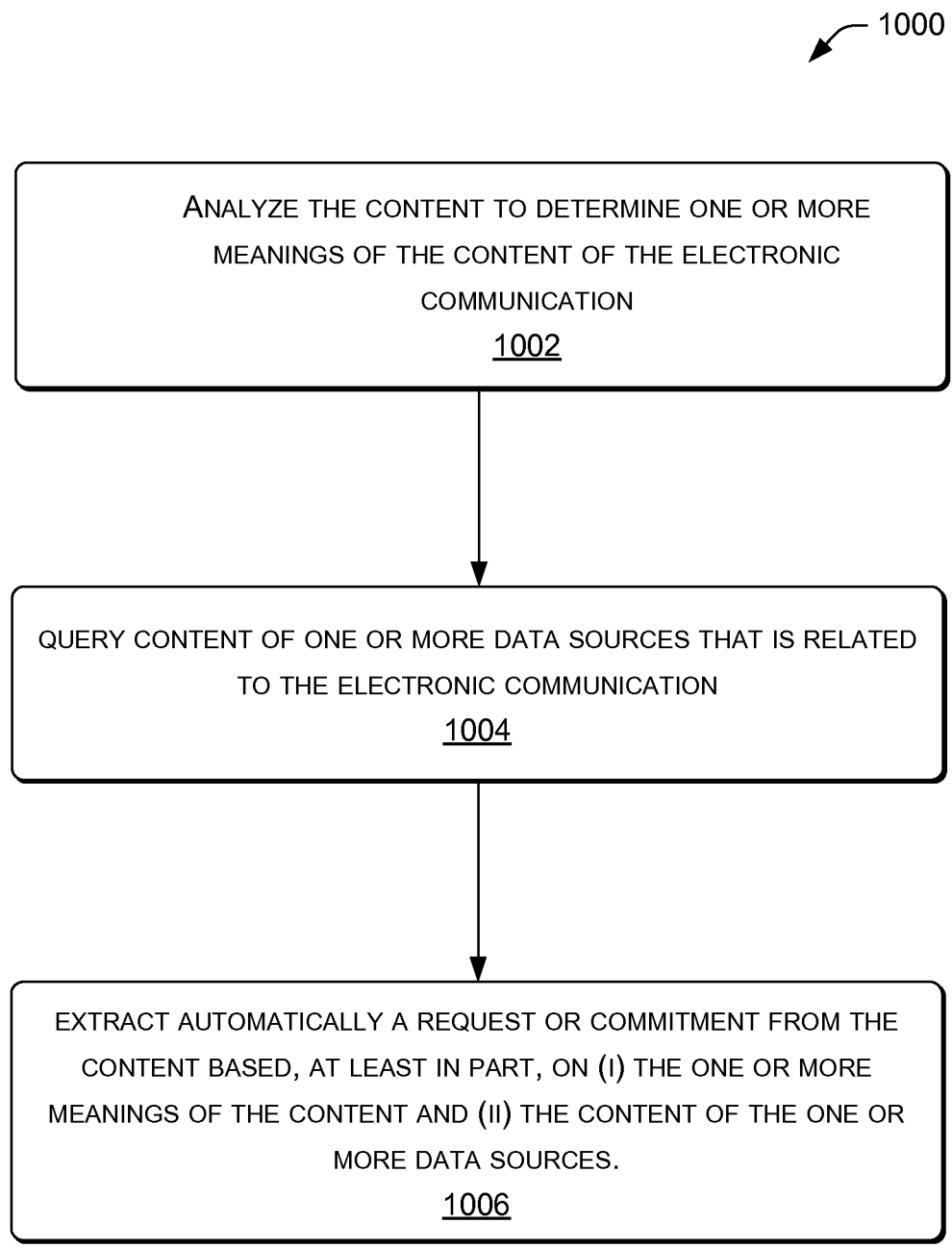
FIG. 10 is a flow diagram of an example task extraction process.

FIG. 10 is a flow diagram of an example task extraction process 1000 that may be performed by an extraction module or a processor (e.g., a processing unit). For example, process 1000 may be performed by computing device 102 (e.g., extraction module 116), illustrated in FIG. 1, or more specifically, in other examples, may be performed by extraction module 502, illustrated in FIG. 5.

At block 1002, the extraction module may analyze the content of an electronic communication to determine one or more meanings of the content. For example, such electronic communication may comprise emails, text messages, non-text content, social media posts, and so on. At block 1004, the extraction module may query content of one or more data sources that is related to the electronic communications. For example, one or more data sources may include any of entities 504-518 described in the example of FIG. 5. In another example, for the extraction module being extraction module 116, one or more data sources may include any portion of computer-readable media 108, described in the example of FIG. 1. The one or more data sources may be related to the electronic communications by subject, authors of the electronic communications, persons related to the authors, time, dates, history of events, and organizations, just to name a few examples.

At block 1006, the extraction module may automatically extract a request or commitment from the content. Such extraction may be based, at least in part, on (i) the one or more meanings of the content and (ii) the content of the one or more data sources.

In some implementations, the electronic communications comprise audio, an image, or video. A conversion module may be used to convert the audio, the image, or the video to corresponding text so as to generate content of the electronic communications. The content of the electronic communications may be provided to the extraction module.

In some implementations, an extraction module may perform process 1000 in real time.

The flow of operations illustrated in FIG. 10 is illustrated as a collection of blocks and/or arrows representing sequences of operations that can be implemented in hardware, software, firmware, or a combination thereof. The order in which the blocks are described is not intended to be construed as a limitation, and any number of the described operations can be combined in any order to implement one or more methods, or alternate methods. Additionally, individual operations may be omitted from the flow of operations without departing from the spirit and scope of the subject matter described herein. In the context of software, the blocks represent computer-readable instructions that, when executed by one or more processors, configure the processor(s) to perform the recited operations. In the context of hardware, the blocks may represent one or more circuits (e.g., FPGAs, application specific integrated circuits—ASICs, etc.) configured to execute the recited operations.

Any routine descriptions, elements, or blocks in the flows of operations illustrated in FIG. 10 may represent modules, segments, or portions of code that include one or more executable instructions for implementing specific logical functions or elements in the routine.

EXAMPLE CLAUSES

A. A system comprising: a receiver port to receive content of an electronic communication; and an extraction module to: analyze the content to determine one or more meanings of the content of the electronic communication; query content of one or more data sources that is related to the electronic communication; and extract automatically a request or commitment from the content based, at least in part, on (i) the one or more meanings of the content and (ii) the content of the one or more data sources.

B. The system as paragraph A recites, wherein the content of the one or more data sources comprises personal data of one or more authors of the content of the electronic communication.

C. The system as paragraph A recites, wherein the electronic communication comprises audio, an image, or video, and further comprising: a conversion module to: convert the audio, the image, or the video to corresponding text to generate the content of the electronic communication; and provide the content of the electronic communication to the extraction module.

D. The system as paragraph A recites, wherein the extraction module is configured to analyze the content of the electronic communication by applying statistical models to the content of the electronic communication.

E. The system as paragraph A recites, wherein the extraction module is configured to augment the extracted request or commitment with identification of people and one or more locations associated with the extracted request or commitment.

F. The system as paragraph A recites, further comprising: a machine learning module configured to use the content of the electronic communication and/or the content of the one or more data sources as training data.

G. The system as paragraph A recites, wherein the extraction module is configured to (i) analyze the content of the electronic communication and (ii) automatically extract the request or commitment from the content of the electronic communication in real time.

H. A method comprising: receiving a message; applying language analysis to the message to automatically transform the message into machine language features; searching sources of data for information related to the message; receiving the information related to the message from the sources of data; and identifying automatically a request or commitment among the machine language features based, at least in part, on the received information.

I. The method as paragraph H recites, wherein the message comprises audio, an image, or a video, and wherein applying the language analysis to the message further comprises: determining text that corresponds to the audio, the image, or the video; and applying the language analysis to the text that corresponds to the audio, the image, or the video.

J. The method as paragraph H recites, wherein the sources of data related to the message comprise other messages.

K. The method as paragraph H recites, wherein the sources of data related to the message comprise one or more aspects of an author of the message.

L. The method as paragraph H recites, wherein receiving the message further comprises: sequentially receiving portions of the message during a time span; and during the time span, applying the language analysis to the received portions of the message.

M. The method as paragraph H recites, further comprising: flagging and/or annotating the message as containing the request or the commitment.

N. A computing device comprising: a transceiver port to receive and to transmit data; and a processor to: analyze an electronic message that is entered by a user via a user interface; search the data for content related to the electronic message; and extract, from the electronic message, text corresponding to a request or to a commitment based, at least in part, on the content related to the electronic message.

O. The computing device as paragraph N recites, wherein the processor is configured to: determine importance of the request or the commitment based, at least in part, on the content related to the electronic message.

P. The computing device as paragraph N recites, wherein the processor is configured to: apply the electronic message or the data as training data for a machine learning process.

Q. The computing device as paragraph P recites, wherein analyzing the electronic message is performed by the machine learning process.

R. The computing device as paragraph N recites, further comprising: an electronic display, and wherein the processor is further configured to generate an image to be displayed on the electronic display, wherein the image includes a prompt for the user to confirm whether the text corresponding to the request or to the commitment is accurate or true.

S. The computing device as paragraph N recites, wherein the processor is further configured to: analyze parameters of the electronic message, wherein the parameters include one or more of: number of recipients, length, date and time, and subject header of the individual electronic message.

T. The computing device as paragraph N recites, wherein the processor is further configured to: analyze information about the user while the user enters the electronic message.

Although the techniques have been described in language specific to structural features and/or methodological acts, it is to be understood that the appended claims are not necessarily limited to the features or acts described. Rather, the features and acts are described as example implementations of such techniques.

Unless otherwise noted, all of the methods and processes described above may be embodied in whole or in part by software code modules executed by one or more general purpose computers or processors. The code modules may be stored in any type of computer-readable storage medium or other computer storage device. Some or all of the methods may alternatively be implemented in whole or in part by specialized computer hardware, such as FPGAs, ASICs, etc.

Conditional language such as, among others, "can," "could," "might" or "may," unless specifically stated otherwise, are used to indicate that certain examples include, while other examples do not include, the noted features, elements and/or steps. Thus, unless otherwise stated, such conditional language is not intended to imply that features, elements and/or steps are in any way required for one or more examples or that one or more examples necessarily include logic for deciding, with or without user input or prompting, whether these features, elements and/or steps are included or are to be performed in any particular example.

Conjunctive language such as the phrase "at least one of X, Y or Z," unless specifically stated otherwise, is to be understood to present that an item, term, etc. may be either X, or Y, or Z, or a combination thereof.

Many variations and modifications may be made to the above-described examples, the elements of which are to be understood as being among other acceptable examples. All such modifications and variations are intended to be included herein within the scope of this disclosure.

What is claimed is:

1. A system comprising:
    a receiver port to receive content of an electronic communication; and
    a processor including an extraction module, the processor to:
        analyze the content to determine one or more meanings of the content of the electronic communication;
        query one or more data sources for information that is related to the electronic communication;
        automatically extract a request and owner of the request from the content based, at least in part, on (i) the one or more meanings of the content and (ii) the information from the one or more data sources, wherein the owner of the request is a first person;
        identify from the content at least one commitment to fulfill the request;
        identify from the content an owner of the at least one commitment and semantics of the at least one commitment;
        identify from the content the owner of the at least one commitment is a second person;
        annotate the content as containing the request or the at least one commitment; and
        cause the annotated content to be displayed at a user interface.

2. The system of claim 1, wherein the information of the one or more data sources comprises personal data of one or more authors of the content of the electronic communication.

3. The system of claim 1, wherein the electronic communication comprises audio, an image, or video, and further comprising:
    a conversion module to:
        convert the audio, the image, or the video to corresponding text to generate the content of the electronic communication; and
        provide the content of the electronic communication to the extraction module.

4. The system of claim 1, wherein the extraction module is configured to analyze the content of the electronic communication by applying statistical models to the content of the electronic communication.

5. The system of claim 1, wherein the extraction module is configured to augment the extracted request or at least one commitment with one or more locations associated with the extracted request or at least one commitment.

6. The system of claim 1, further comprising:
    a machine learning module configured to use at least one of the content of the electronic communication or the information of the one or more data sources as training data.

7. The system of claim 1, wherein the processor automatically extracts the request or the at least one commitment from the content of the electronic communication in real-time.

8. A method performed by a computer, the method comprising:
    receiving messages;
    applying language analysis to the messages to automatically transform the messages into machine language features;
    searching sources of data for information related to the messages;
    receiving the information related to the messages from the sources of data;
    automatically identifying a request and owner of the request among the machine language features based, at least in part, on the received information, wherein the owner of the request is a first person;
    identifying at least one commitment to fulfill the request based, at least in part, on the request and the machine language features;
    identifying that the at least one commitment is from a second user based, at least in part, on the machine language features; and
    performing, by the computer, an automatic service related to and in response to identifying the at least one commitment to the request from the second user by the computer; and
    flagging or annotating, at a user interface, one or more of the messages as containing the request or the at least one commitment.

9. The method of claim 8, wherein the messages comprises audio, an image, or a video, and wherein applying the language analysis to the messages further comprises:
    determining text that corresponds to the audio, the image, or the video; and
    applying the language analysis to the text that corresponds to the audio, the image, or the video.

10. The method of claim 8, wherein the sources of data related to the messages comprise other messages.

11. The method of claim 8, wherein the sources of data related to the messages comprise one or more aspects of an author of the messages.

12. The method of claim 8, wherein receiving the messages further comprises:

sequentially receiving portions of the messages during a time span; and during the time span, applying the language analysis to the received portions of the messages.

13. The method of claim 8, further comprising:

annotating content of one or more of the messages as containing the request or the at least one commitment.

14. A computing device comprising:

a transceiver port to receive and to transmit data; and a processor to:
- analyze an electronic message that is entered by a user via a user interface,
- search the data for content related to the electronic message,
- extract, from the electronic message, text corresponding to a request based, at least in part, on the content related to the electronic message,
- identify from the content at least one commitment from another user to fulfill the request,
- review the request to identify if any missing information is needed for performance of the request in response to the at least one commitment,
- identify missing information based on the review,
- query a data source for the missing information in response to identifying the missing information, and
- flag or annotate, at the user interface, the electronic message as containing the request or the at least one commitment.

15. The computing device of claim 14, wherein the processor is configured to:
- determine an importance of the request or the at least one commitment based, at least in part, on the content related to the electronic message.

16. The computing device of claim 14, wherein the processor is configured to:
- apply the electronic message or the data as training data for a machine learning process.

17. The computing device of claim 16, wherein analyzing the electronic message is performed by the machine learning process.

18. The computing device of claim 14, wherein the processor is configured to:
- generate an image to be displayed at the user interface, wherein the image includes a prompt for the user to confirm whether the text corresponding to the request or to the at least one commitment is accurate or true.

19. The computing device of claim 14, wherein the processor is configured to:
- analyze parameters of the electronic message, wherein the parameters include one or more of: number of recipients, length, date and time, and subject header of the electronic message.

20. The computing device of claim 14, wherein the processor is configured to:
- analyze information about the user while the user enters the electronic message.

\* \* \* \* \*